J. A. JONES.
Peach-Assorters.

No. 150,961. Patented May 19, 1874.

2 Sheets--Sheet 1.

Witnesses.
Inventor.

J. A. JONES.
Peach-Assorters.

No. 150,961.

Patented May 19, 1874.

Witnesses.
T. C. Brecht
W. J. Payton

Inventor.
John A. Jones.
By James L. Norris,
Atty.

UNITED STATES PATENT OFFICE.

JOHN A. JONES, OF MOUNT PLEASANT, DELAWARE.

IMPROVEMENT IN PEACH-ASSORTERS.

Specification forming part of Letters Patent No. 150,961, dated May 19, 1874; application filed February 16, 1874.

*To all whom it may concern:*

Be it known that I, JOHN A. JONES, of Mount Pleasant, in the county of New Castle and State of Delaware, have invented certain new and useful Improvements in Adjustable Peach-Assorter, of which the following is a specification:

This invention relates to an apparatus for assorting peaches, apples, potatoes, and vegetables, which is so constructed that the peaches or other fruit are freed from leaves and refuse, and assorted according to size and quality.

The invention consists, first, in the employment of an inclined receiving hopper or chute, which is provided with a flexible or soft bottom at its top or receiving end, and with a slatted or open-work bottom, forming a continuation of the inclined flexible bottom, said hopper being designed for separating leaves and refuse from the fruit, and to deliver the latter to an assorting apparatus located in continuation of the receiving hopper or chute. The invention further consists in an assorting mechanism comprising a box or trough, the bottom of which is formed of a series of revolving conveyer rollers or shafts, geared together to revolve simultaneously in opposite directions, and adjustable in respect to each other, so as to vary the size of the discharge openings or passages between the rollers. The invention further consists in providing the assorting-box with rollers varying in diameter for assorting the fruit, and suspending beneath said rollers, receiving troughs or chutes having elastic or soft bottoms, to prevent the fruit from being injured. The invention further consists in mounting the axes of the assorting-rollers in pivoted arms, with the exception of one pair of rollers, which are stationary, said arms being connected to an oblique bar, so that the adjustment of the different rollers may be performed simultaneously, a clamping and gaging plate being also combined with the rollers, so as to enable the exact degree of adjustment to be readily determined.

Figure 1:
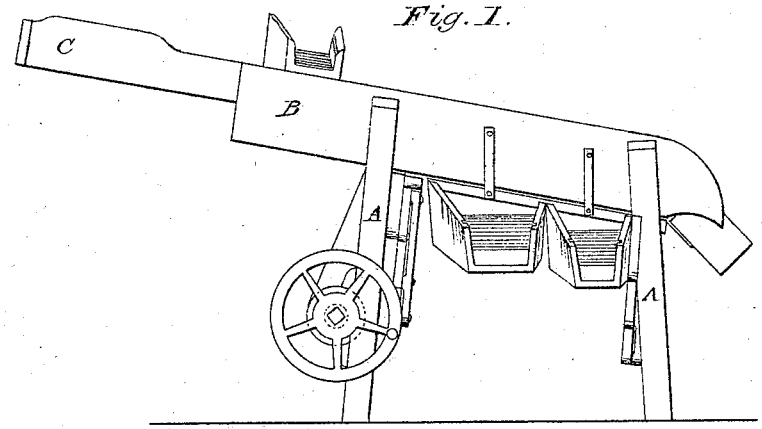
Figure 2:
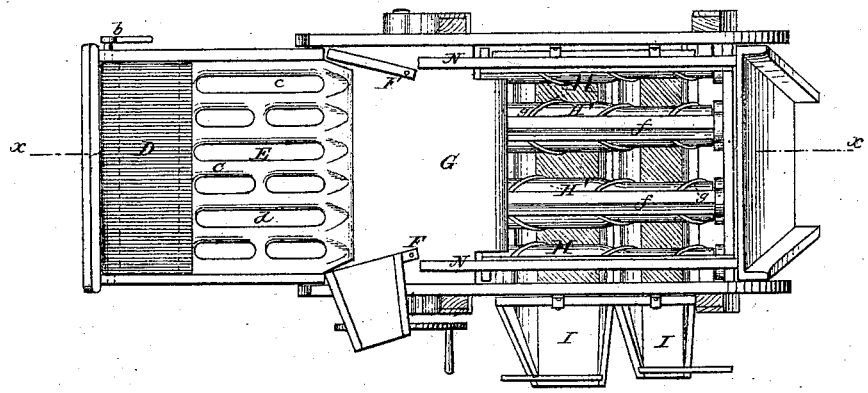
Figure 3:
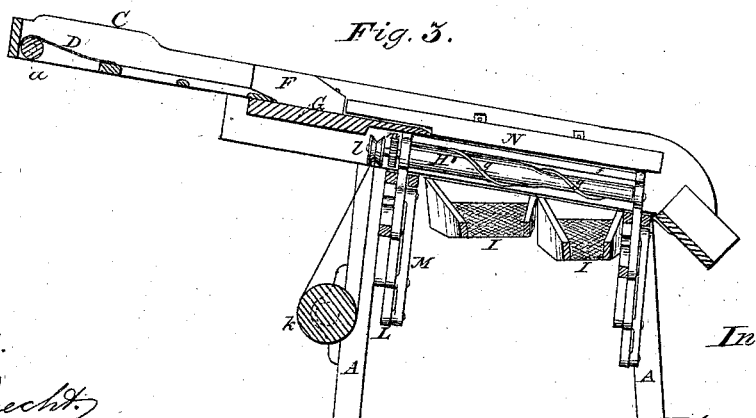
Figure 4:
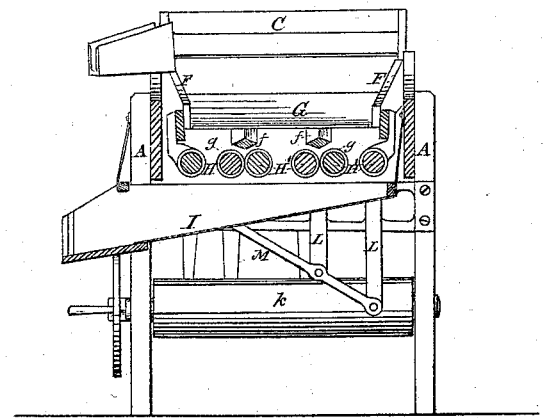
Figure 5:
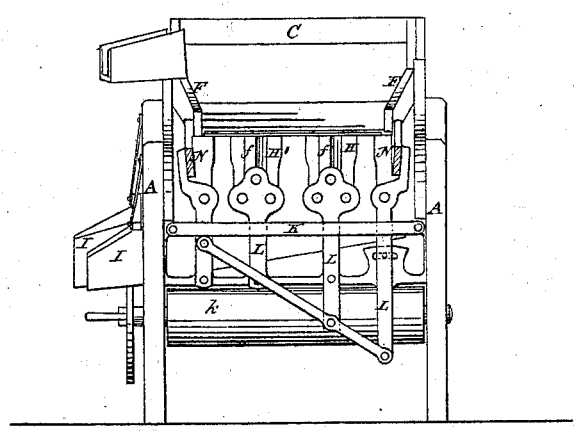
Figure 6:
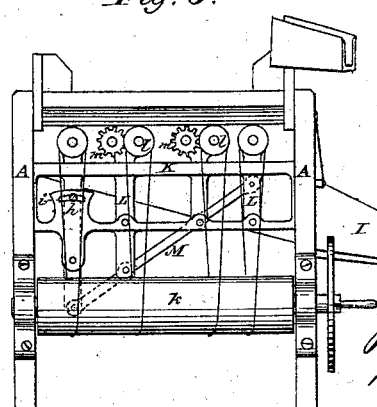

In the drawings, Figure 1 represents a side elevation of my assorter; Fig. 2, a top view of same; Fig. 3, a vertical longitudinal section on line $x\ x$ of Fig. 2; Fig. 4, a vertical cross-section; Fig. 5, a rear-end view, and Fig. 6 a view of the receiving end.

Upon a suitable frame, A, is mounted the inclined assorting-box B, which is provided with an inclined receiving hopper or chute, C. Said chute is supported in position by the box B, or by a separate trestle-work, and is provided at its upper or receiving end with a flexible or yielding bottom, D, made of a suitable textile fabric, rubber, or leather, and combined with a tension device for tightening and loosening the same, consisting of a roller, $a$, operated by means of a handle, $b$. A grated or open-work bottom, E, forming the continuation of the flexible bottom, is composed of parallel bars, $c$, located at the requisite distance apart to form open gutters $d$, down which the fruit passes to the assorting-box. By means of this construction of receiving-hopper the fruit may be thrown in without danger of being bruised, and in passing over the grated bottom or screen all the leaves or refuse escape through the bottom. At the upper end of the assorting-box B is located a separating-table, G, extending about one-third of its length, and upon which table the fruit is received after its passage from the grated hopper. The fruit in passing over this table is spread, so as to enable the attendant to separate the bad or unmarketable from the good or marketable fruit, the latter passing thence upon a series of rollers, H H′, forming the open bottom of the assorting-box B. These rollers vary in diameter throughout their length, so as to enable the fruit to be assorted according to grade or size, the largest diameter being at the top and the smallest at the bottom.

The outer rollers H are located in juxtaposition to the side walls of the assorting-box, and between said rollers are located rollers H′, which are arranged together in pairs, and geared or coupled together to revolve in opposite directions. One pair of said inner rollers is made stationary, while the others are movable in a lateral direction in respect to the same and the sides of the box, so as to vary the spaces between the different rollers. The rollers are provided with spiral conveyer-wings $g$, which are preferably made of rubber or leather, so that the fruit in passing over the rollers is not liable to be injured; but when circumstances permit it, the conveyer-wings may be turned on the rollers or be made of metal.

Beneath the rollers, and suspended detachably and adjustably from the sides of the box, are located two or more troughs, I, corresponding in number and position with the varying diameter of the rollers, and into which the assorted fruit falls to be conducted into suitable receptacles ready for the market. The troughs are provided with yielding or soft bottoms of canvas or other soft or elastic material, to prevent the fruit being bruised upon falling through the spaces between the assorting-rollers. The inner pairs of assorting-rollers are provided with covering-strips $f$, which are located directly over the space between the two rollers, in order to prevent the fruit from lodging in said space, thus obviating the crushing of the fruit and the clogging of the rollers. At each end of the frame A are two horizontal bars, K, the top one being slotted to admit of the movement of the hanging arms L of different lengths, which are pivoted to the lower one, and connected with each other by an oblique rod, M. The longest arms L are provided with pins or clamping-bolts $h$, which move in the arc of a circle in gaged slots $i$ on the lower bars K, by means of which the movement of the rollers laterally, to increase or decrease their intervening spaces, is effected, and by which they are adjusted and clamped. The arms of the stationary pair of rollers are, however, not pivoted, but are fixed securely to the frame, to enable the other rollers to be moved to or from the same. The assorting-rollers are revolved simultaneously in opposite directions through the medium of an operative mechanism, consisting of a roller, $k$, belts $k'$, and spindle or pulley heads $l$ at the ends of the rollers, the inner pairs of rollers being geared together by spur-wheels $m$, so as to revolve in opposite directions. The driving force is applied to the roller $k$ through the medium of a crank, treadle, or other suitable prime motor. The outer assorting-rollers are combined with longitudinal vertical fender-strips N, which are designed to prevent the fruit from passing between said rollers and the side walls of the assorting-box to avoid the crushing of the fruit. Said fender-strips operate, in conjunction with movable fender-boards F, hinged or pivoted to the separating-table G, to prevent any fruit from passing between the outer rollers from the separating-table, as the boards F can be adjusted to conform to the position of the fender-strips on the rollers. One of said fender-strips carries a chute or exit for the condemned or rotten fruit separated on the table G.

Having thus described my invention, what I claim, and desire to secure by Letters Patent, is—

1. In a peach or fruit assorter, an inclined receiving hopper or chute, provided with a flexible or soft bottom at its top or upper end, and with a slatted or open-work bottom at its lower end, forming a continuation of the inclined flexible bottom, for separating leaves and refuse from the fruit, and delivering the latter to the assorting-rollers, substantially as described.

2. An assorting mechanism, consisting of a series of spirally-flanged rollers operating in the bottom of a box, and adjustable laterally in respect to each other, substantially as described.

3. In combination with the rollers H, arranged in fixed arms near the side walls of the assorting-box, the rollers H', mounted in the arms L, which are adjustable by means of the clamping-bolts $h$ and slots $i$, for increasing or decreasing the space between the rollers, and with mechanism, substantially as described, for imparting a rotary motion to the said rollers, as set forth.

4. The assorting-rollers H H', tapering in the direction of their length, with their largest diameter at the top and their smaller diameter at the bottom, substantially as shown and described, for assorting the fruit according to its size, as set forth.

5. The box A, provided with the rollers H H', varying in size, for assorting the fruit, in combination with the receiving-troughs I, suspended beneath said assorting-rollers, and having flexible or yielding bottoms, substantially as and for the purpose herein set forth.

6. An apparatus for assorting peaches, comprising a slatted or open-work hopper or chute, a separating-table, and a series of assorting-rollers in combination, substantially as described.

In testimony that I claim the foregoing I have hereunto set my hand this 28th day of January, 1874.

JOHN A. JONES.

Witnesses:
 JAMES L. NORRIS,
 WM. J. PEYTON.